United States Patent

Phillips et al.

[15] 3,707,614

[45] Dec. 26, 1972

[54] WELDER

[72] Inventors: Delbert L. Phillips, Malibu; Lewis Clark Feightner, Chatsworth, both of Calif.

[73] Assignee: New Twist Connector Corporation, Santa Monica, Calif.

[22] Filed: June 1, 1970

[21] Appl. No.: 54,056

Related U.S. Application Data

[62] Division of Ser. No. 715,773, March 25, 1968, Pat. No. 3,609,284.

[52] U.S. Cl. ..................219/97, 219/95, 219/161
[51] Int. Cl. ..........................B23k 9/00, B23k 11/04
[58] Field of Search......219/95, 96, 97, 98, 100, 113, 219/161

[56] References Cited

UNITED STATES PATENTS

| R17,949 | 2/1931 | Chubb | 219/96 X |
| 3,254,194 | 5/1966 | Phillips | 219/113 X |
| 3,400,239 | 9/1968 | Fahrenbach | 219/97 |
| 3,505,494 | 4/1970 | Ruetschi | 219/95 X |

FOREIGN PATENTS OR APPLICATIONS

| 1,246,141 | 8/1967 | Germany | 219/98 |

Primary Examiner—J. V. Truhe
Assistant Examiner—Hugh D. Jaeger
Attorney—Smyth, Roston & Pavitt

[57] ABSTRACT

One of two small workpieces that are to be welded together is slidingly mounted in a fixed workholder and the other is firmly gripped by a movable workholder. To carry out an operating cycle, the movable workholder is reciprocated by two lobes of a cam that makes on revolution when momentarily connected to a relatively large mass that rotates at constant velocity. Initially the first slidable workpiece is placed at random at a position that is advanced slightly from the position desired for the welding operation but the first reciprocation of the second workpiece is against the slidable workpiece to retract it precisely to the desired position for a welding operation. In carrying out the second reciprocation, the two workpieces are charged by capacitance and as the gap between the two workpieces narrows a high frequency pulse triggers an arc between the two workpieces and the continued advance of the second workpiece crowds the two workpieces together for final fusion.

15 Claims, 12 Drawing Figures

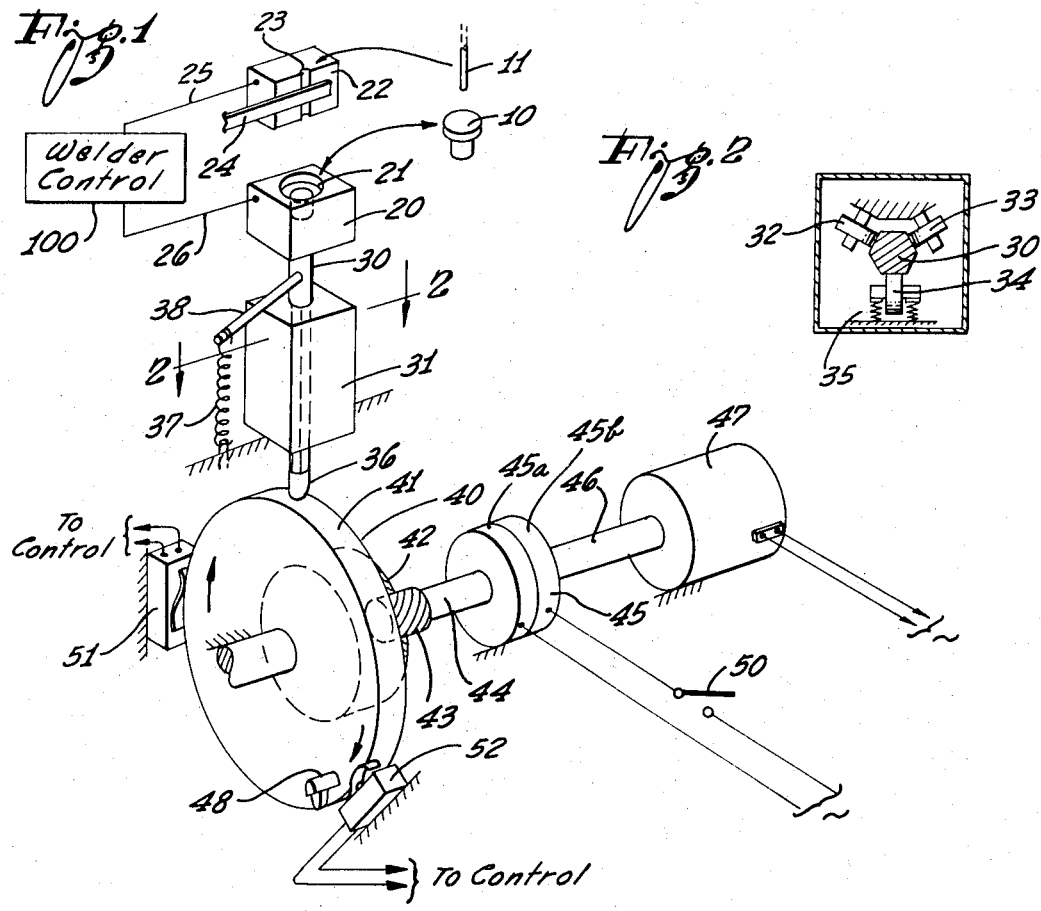
Fig. 1
Fig. 2
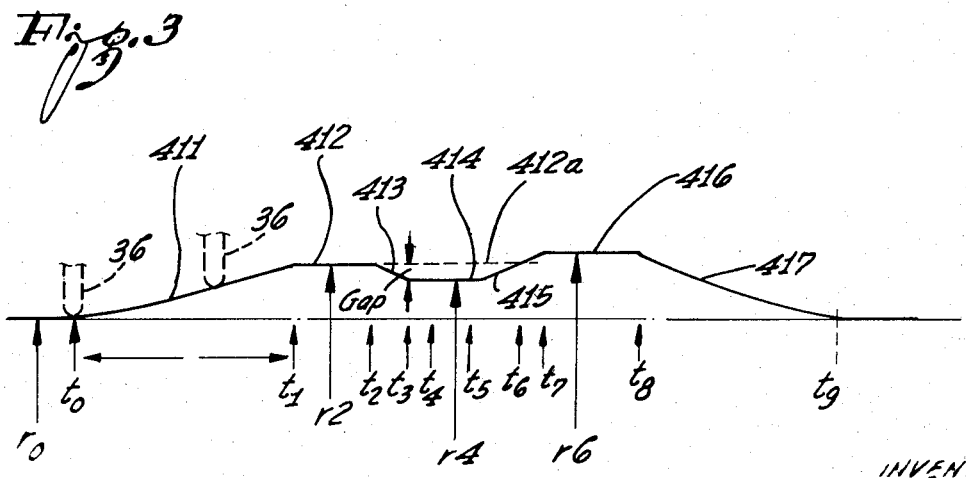
Fig. 3
INVENTORS:
Delbert L. Phillips
Lewis Clark Feightner
ATTORNEYS PATENTED DEC 26 1972
3,707,614
SHEET 4 OF 4
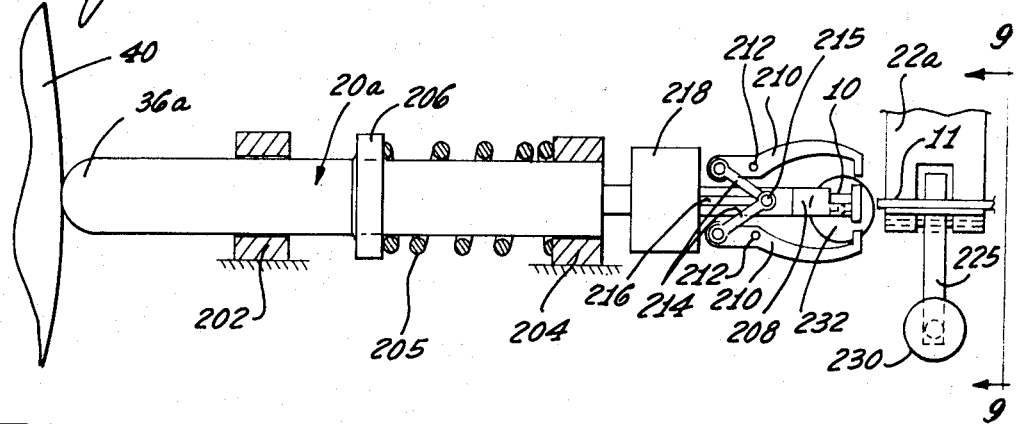
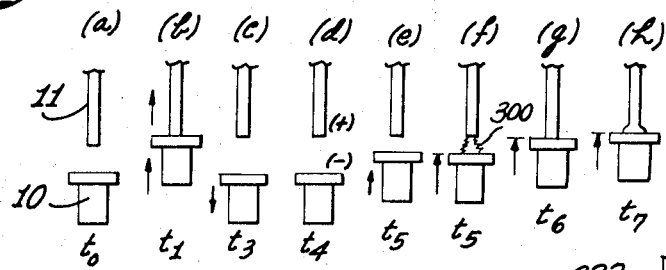
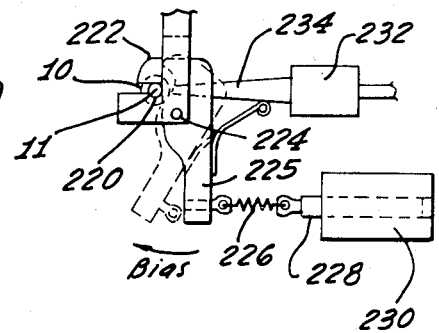
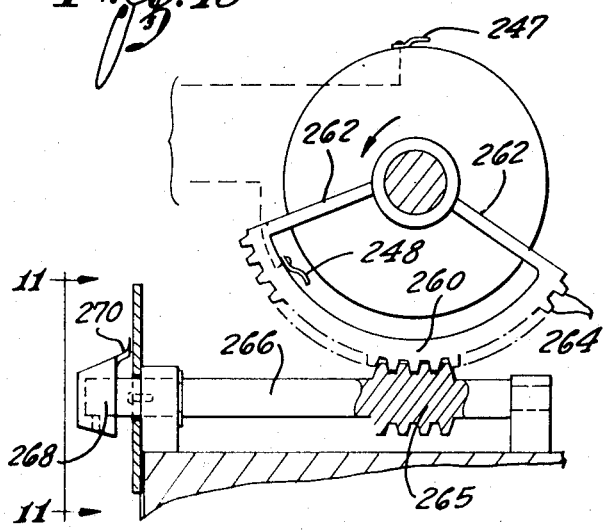
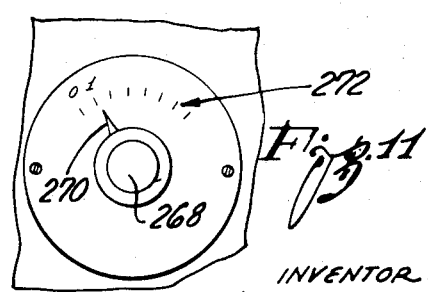
INVENTOR:
Dalbert L. Phillips
Lewis Clark Feightner
By Smyth, Roston & Pavitt
ATTORNEYS

WELDER

CROSS-REFERENCES TO RELATED APPLICATIONS

This is a division of application Ser. No. 715,773, filed Mar. 25, 1968, now U.S. Pat. No. 3,609,284.

BACKGROUND OF THE INVENTION

The invention relates to an arc welding technique of the character disclosed in the three Phillips' U.S. Pat. Nos. 3,254,193, 3,254,194 and 3,254,195 and it is to be understood that any of the circuits disclosed in the three prior patents may be adapted for use in the present disclosure even though the circuit disclosed herein is highly advantageous and has special utility. All three of these patents teach that with an electrode spaced from a workpiece or with two workpieces spaced from each other by a suitable gap, an arc may be created across the gap by first employing capacitor means to create a potential across the gap and then employing a high frequency pulse to trigger an arc.

The present invention is directed primarily to the problem of developing a means and a method of joining small workpieces by arc welding in highly accurately repeated operating cycles wherein the required duration of the arc may be as low as one third of a millisecond and usually does not exceed eight milliseconds. The basic problem is to provide exceedingly accurate and unvarying control on such a small time scale.

The Phillips' U.S. Pat. No. 3,254,193 is of special interest in that it teaches mounting one of the two workpieces on a fixed workholder, mounting the other workpiece on a relatively light workholder and then applying force to the workholder to accelerate it to high velocity to bring the two workpieces together with the arc triggered as the gap narrows between the two workpieces. The movable workholder is normally retracted by a suitable spring and is electromagnetically advanced by energization of coil means to carry out an operating cycle. This procedure is operative for its purpose but has certain disadvantages when the primary requirement is accurate adjustability and accurate repetition of operating cycles and especially so when the duration of the arc must be controlled within microseconds and the operating cycle must be repeated rapidly for high speed production.

The described prior art procedure has the following disadvantages:

1. Friction is a variable factor and the presence of a foreign particle may change both the rate of movement of the workholder and the timing of the arc relative thereto.
2. Since the advance of the workholder to carry out an operating cycle is increasingly opposed by the return spring, the spring is a variable factor.
3. The electromagnetic driving force increases exponentially at one rate while the opposing resistance of the spring increases at a different rate to make close adjustment difficult.
4. Each operating cycle necessarily includes time for acceleration of the workholder as a free body prior to the actual welding operation and for reasons including the above factors the rate and degree of acceleration of the free body is not subject to the degree of control required for accurate repetition of an operating cycle.
5. The triggering of the arc is responsive to changes that occur in the current flow in the circuitry that includes the coil for actuating the workholder and largely because of the heretofore stated factors the timing of the triggering of the arc may vary from cycle to cycle relative to the position of the moving iron core.
6. The extent to which the two workpieces are crowded together for final fusion depends on a number of factors including: the mass of the workholder; the velocity of the workholder at the moment of impact between the two workpieces; the effect of the spring in decelerating the workholder; and the resistance to deformation of the heated portions of the two workpieces. Obviously adjusting the crowding action to the needs of different workpieces is complicated.
7. Since the moving workpiece is part of the electromagnetically driven workholder, changing over from one size of workpiece to another introduces a variable in that it changes the mass that is electromagnetically accelerated.
8. It has been found that an arc welding device of the character must have a certain relatively wide range of flexibility. At one extreme the arc employed to join two pieces of copper must be intense for generating heat at a relatively high rate but must be of short duration because of the high conductivity of copper. At the other extreme, the welding of an alloy containing zinc is made possible for the first time by employing a low intensity arc of prolonged duration. Thus for welding copper the arc may have a duration of ⅓ of a millisecond while an arc for a zinc alloy may have a duration of 8 milliseconds. In addition the rate at which the gap is closed between two workpieces must be variable because the different physical properties of different molten metals affects their behavior as they are forced together. This prior art apparatus is inherently incapable of flexibility in these important respects.

The present invention is not only directed to the elimination of these disadvantages but also is directed to important improvements in the circuitry for producing the arc.

SUMMARY OF THE INVENTION

In a preferred embodiment of the invention for a fully automatic operating cycle, a rotary cam means formed with two circumferentially spaced lobes is engageable with a continuously rotating structure of relatively high mass through speed-reducing gearing by means of a clutch which rotates the cam for one full revolution for one complete cycle of operation and then the cam is stopped at its starting position by a suitable brake. A first workpiece is frictionally slidingly mounted in a stationary workholder and the second workpiece is firmly mounted in a movable workholder that is reciprocated twice by a follower cooperating with the two lobes of the cam means. The first slidable workpiece is located in a random manner on the first workholder at a position advanced somewhat towards the second workpiece and when the second workpiece is reciprocated by the first cam lobe, the second workpiece encounters the first workpiece and retracts the first workpiece accurately to a starting position for carrying out the work cycle. When the second workholder retracts, the distance between the two workpieces is precisely the magnitude of its retraction regardless of the initial position of the first workpiece in the first workholder and regardless of the initial position of the second workpiece in the second movable workholder. Thus the first reciprocation results in accurate predetermined starting gap between the two workpieces.

After a short pause controlled by a lower dwell on the rotary cam means, the movable workholder is reciprocated again to close the gap between the two workpieces and at a precisely predetermined point in the rotation of the cam means an arc is triggered between the two spaced workpieces to melt the metal of the confronting surfaces of the two workpieces and the second workholder continues to advance the second workpiece after the two workpieces abut each other, the additional advance crowding the workpieces together for complete fusion of the heated portions of the workpieces. The force with which the fusing workpieces are crowded together may be limited to any desired magnitude by simply varying the friction with which the workpiece is slidingly retained in the stationary workholder.

At the start of the operating cycle, the two workpieces are simply placed at suitable positions on the two workholders and as soon as the operating cycle is started the two workholders automatically grip the two workpieces. At the end of the operating cycle the two workholders automatically release the welded product and then the welded product is automatically ejected.

After the first reciprocation of the movable workholder, a voltage is placed across the two workpieces and subsequently the arc is triggered in response to arrival of the second workpiece at a precisely predetermined point in its second movement towards the first workpiece. To create the desired voltage across the two workpieces, the cam means operates a relay for connecting capacitor means to a voltage source and alternately to connect the capacitor means to the two workpieces; means controlled by the cam means keeps the initially engaged clutch engaged until a suitable point near the end of the operating cycle; further means controlled by the cam means operates solenoids for gripping the two workpieces; further means operated by the cam means controls a third solenoid for ejecting the finished product; and still further all important means controlled by the cam means triggers the arc at an exactly predetermined point in the approach of the movable workpiece to the stationary workpiece.

The manner in which the described cyclic mechanism avoids the previously mentioned disadvantages of the prior art mechanism is explained as follows:

1. With a driving structure of relatively large mass rotating at a constant velocity for a normal steady state condition, frictional resistance to movement of the driving mass is eliminated and with the mass of the driving structure far exceeding the mass of the movable workholder, frictional resistance to movement of the workholder may be neglected.
2. A spring is provided to hold the workholder follower against the cam means and to return the movable workholder after each advance but the spring force is more than adequate to maintain constant contact between the workholder follower and the cam means with the result that the spring itself does not affect the operating cycle and especially so because of the mass of the driving structure.
3. Since the cam means is fully accelerated by the high momentum of the drawing mass prior to actuation of the movable workholder the displacement of the workholder follower by the leading slope of the second cam lobe is at an accurately predetermined rate for accurate control of the rate at which the gap between the two workpieces is closed after the arc is triggered.
4. Since no time interval is required in the operating cycle for acceleration of the constantly rotating mass, acceleration is removed as a factor and the operating cycle may be correspondingly shortened.
5. Since the arc is triggered in response to the arrival of the workholder follower at a precisely predetermined point in the rotation of the cam means, the timing of the triggering of the arc is precisely predetermined in advance of mutual abutment of the two heated workpieces. Thus the correlation of the ignition of the arc with the closing of the gap may be accurately maintained over a long production run.
6. Since the first reciprocation of the movable workholder accurately establishes a predetermined gap between the two workpieces and since the advance of the second workpiece on the second reciprocation of the movable workholder exceeds the first advance by a predetermined increment, the extent to which the two workpieces are crowded together in the final fusing step is accurately predetermined and is constant over a large production run. With the crowding action accomplished by the cooperation of the follower and the cam means, the crowding action is not determined directly by the magnitude of the moving mass nor is it affected by any spring means nor is it necessarily limited by the resistance to deformation of particular workpieces.
7. Changing over from the processing of workpieces of a given mass to the processing of workpieces of a different mass only slightly affects the rate at which the two workpieces are brought into mutual contact because the ratio between the high momentum of the driving mass and the relatively small mass of the movable workpiece is exceedingly high, say 2200:1. This fact may be appreciated when it is considered that in the previously described cycle of operation disclosed in the Phillips' U.S. Pat. No. 3,254,193 the ratio between the approximately one ounce weight of the workholder and the one-tenth gram weight of a typical small workpiece mounted on the core is approximately 260:1 whereas in the present invention the ratio between the weight of the driving structure and the weight of the same workpiece is approximately 10,000:1. It may be readily appreciated that with this overpowering ratio, the driving mass acts like a stabilizing flywheel to insure that all of the operating cycles are precisely identical. Changing over to a different workpiece of a different weight may vary the operating cycle but only to slight degree and in any event the new cycle pattern is accurately reproduced on each cycle.

Since the momentum of the driving structure on which the operating cycle is based varies with its velocity; it is desirable to move the driving mass at high velocity. On the other hand, high velocity of the driving mass may result in moving the two workpieces together at an undesirably high velocity. A feature of the invention in this regard is the provision of suitable speed reducing means for operatively connecting the movable workpiece with the driving mass. In the initial practice of the invention the motor for driving the cam means rotates at a desirable high velocity for the sake of high momentum but reduction gearing reduces the angular velocity of the cam means to one-sixth of the angular velocity of the motor rotor and, if desired, further reduction in the velocity imparted to the movable workpiece may be provided by forming the lobes of the cam means with gradual leading slopes.

As will be apparent, the new circuitry has unique advantages including adjustability of the intensity and duration of the arc, such adjustability being provided by adjustability in the capacity of the capacitor means that is charged to provide the energy of the arc, as well as adjustability in the voltage of the applied charge and adjustability in the impedance of the arc-sustaining circuit. In the preferred practice of the invention a choke coil may be placed in the arc-sustaining circuit whenever desired and different taps on the choke coil may be used for different degrees of impedance by the choke coil.

The flexibility of the operating cycle may be appreciated when it is considered that the magnitude of energy expended in the arc may be varied at will and the duration of the arc may be varied independently of the total arc energy. A further feature of the invention in this regard is that the timing of the triggering of the arc relative to the moment of contact of the two workpieces is also readily adjustable by the simple expedient of changing the position of a contact that cooperates with the cam means to trigger the arc. In the preferred practice of the invention the triggering contact is moved by a manually operable knob that shifts the contact by screw action and a pointer operated by the knob traverses a scale that is calibrated in microseconds of duration of the arc.

With exact control over the three factors of arc energy, arc duration and the timing of the triggering of the arc relative to the closing of the gap between the two workpieces, the welding function may be readily adjusted to meet the specific requirements of any particular pair of workpieces. Thus the energy of the arc may be adjusted as required for melting different metals and for melting different quantities of the different metals and the duration of the arc may be shortened to minimize the melted zones of the workpieces or may be extended when desirable to vaporize oxides and impurities prior to the moment of mutual abutment of the workpieces.

The various features and advantages of the invention may be understood from the following detailed description and the accompanying drawings.

BRIEF DESCRIPTION OF THE DRAWINGS

In the drawings, which are to be regarded as merely illustrative:

FIG. 1 shows somewhat schematically and partially in a perspective view, the mechanical part of the welding apparatus in accordance with the present invention;

FIG. 2 illustrates a cross-sectional view through the guide system for one of the workpiece holders used in the equipment shown in FIG. 1.;

FIG. 3 is a development of the cam used for controlling the motion of one of the workpiece holders shown in FIG. 1;

FIG. 7 is a schematic view showing different stages in the two reciprocations of the movable workholders;

FIG. 8 is a simplified elevational view of the two workholders;

FIG. 9 is a side elevational view of the stationary workholder;

FIG. 10 is a fragmentary view partly in side elevation and partly in section showing the mechanism for varying the timing of the triggering of the arc relative to the closing of the gap between the two workpieces;

FIG. 11 is an elevational view as seen along the line 11 — 11 of FIG. 10 showing a scale that is associated with the mechanism in FIG. 10, the scale being calibrated in microseconds of duration of the arc.

DESCRIPTION OF THE PREFERRED EMBODIMENTS

Figure 4:
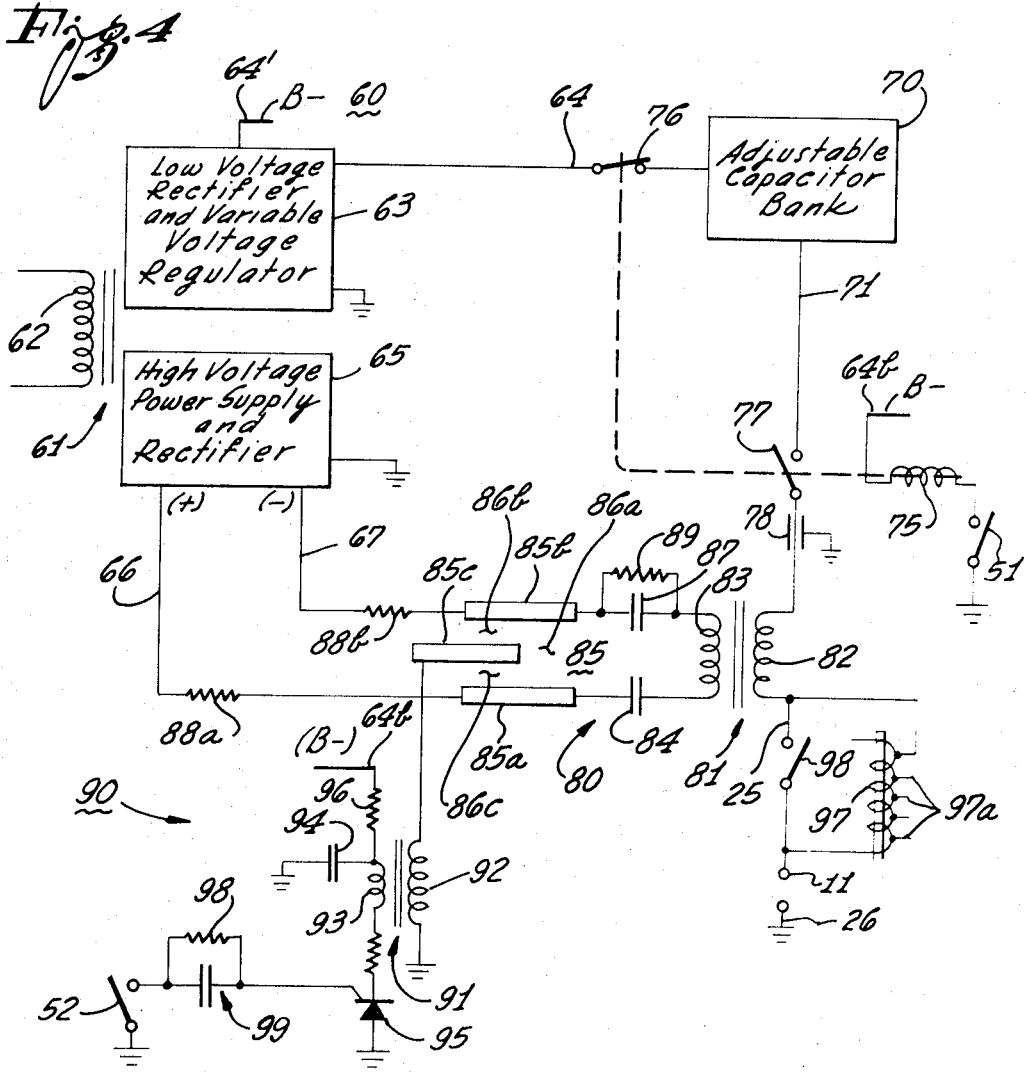
FIG. 4 illustrates somewhat schematically a circuit diagram, partially as a block diagram, of the control of the welding current and arc ignition control circuit in accordance with a first embodiment of the present invention.

Proceeding now to the detailed description of the drawings, FIG. 1 thereof illustrates a welding apparatus in accordance with the present invention. The illustration is somewhat schematically but partially in a perspective view. Of specific interest is the welding of small elements. For example, in FIG. 1, numerals 10 and 11 denote two workpieces to be welded together. Element 10 is a semiconductor device such as a transistor, an integrated circuit, etc., encapsuled in a metallic shell. The other workpiece is a connecting wire 11 to be connected to element 10. One can see that the welding process is a most critical one because an excessive heat development will destroy the semiconductor device in the interior of the container, whereas too little thermal energy developed will produce an unsatisfactory weld. Since effective thermal energy is determined by the balance of heat inflow and outflow at any instant, the duration of the period during which a particular amount of electrical energy is supplied and converted into thermal energy is most critical. Therefore, the welding, i.e., thermal, energy and the development of that energy, i.e., the duration of the weld, all have to be determined rather accurately in order to produce a satisfactory weld which does not destroy the product.

The welding device proper includes a workholder 20 having an opening or pocket 21 into which a workpiece can be inserted. The pocket 21 has a configuration adapted to receive and position a particular workpiece in the form of an encapsulated transistor. Of course, a different type of holder may be used for a workpiece of different configuration. It is important that the particular holder positions the one workpiece in a manner to expose a surface portion thereof to which the other workpiece is to be welded.

Reference numeral 22 denotes another workholder which is stationary. Holder 22 has a groove 23 over which is placed a clamp 24 for frictionally holding a workpiece in the form of a wire 11 in the groove. The clamping action is strong enough to grip the workpiece effectively to carry out the fusing or forging of the two workpieces but is light enough to permit initial slippage for the purpose of accurately determining the gap between the two workpieces.

The workholders are at least partly made of metal so that electric voltage potentials can be applied to the workpieces thereon. It follows that workholders 22 and 24 must be electrically insulated from each other. A wire 25 connects the workholder 22 to a welder current control circuit 100, to be described more fully below, and a flexible electrical connection 26 leads from the welder control circuit 100 to the workholder 20.

The workholder 20 is movably disposed on a vertically movable rod 30. The rod 30 is prevented from tilting by a guiding arrangement 31. A portion of the guiding arrangement is shown in a cross-sectional view in FIG. 2. The rod 30 may have a portion hexagonal cross-section that is guided by two sets of three rollers each; one of the sets is shown in FIG. 2. There are two rollers 32 and 33 which have a fixed axis of rotation and engage two different sides of the rod 30. The axes of the rollers 32 and 33 are at an angle of 120°. The shaft of the third roller 34 is under the influence of springs 35 urging the shaft towards the rod 30. The springs thus provide for positive engagement of all three rollers with the rod. As stated above, there is a second set of rollers for additionally guiding the rod 30. If the second set of guide rollers is accurately mounted in vertical alignment with the one illustrated, rod 30 is accurately guided for vertical longitudinal motion.

The lower end of the rod 30 terminates in a cam follower 36. A spring 37 is anchored at one end to a stationary part of the device and its other end is anchored to a pin 38 which, in turn, projects from rod 30. The spring is biased to urge pin 38 in down direction to thereby urge the follower 36 of the rod 30 into engagement with a cam 40. The cam 40 is capable of pushing bar 30 in up direction, while spring 37 retracts bar 30 when the moving contour of cam 40 so permits.

The cam 40, and particularly the periphery 41 thereof, serves additionally to control a switch 51 which has an appropriate follower arm and which is connected electrically to the welder control circuit 100 in a manner to be described more fully below. A projection 48 on the cam 40 serves to control a second switch 52 which likewise pertains to the welder control circuit 100 and to which will be made reference more fully below. On this particular embodiment of the invention the switch 51 responds to the same cam lobes that control the follower 36 of the workholder rod 30.

Cam 40 is provided with a spur gear 42 meshing a pinion 43 on a shaft 44 which is operatively connected to a brake-clutch assembly, generally designated 45, comprising a brake 45a and a clutch 45b. The rotary input of the clutch 45b is derived from a shaft 46 driven by a synchronous motor 47. The synchronous motor 47 is continuously connected, at least during extension welding operations, to an a-c source of standard frequency. Motor 47 thus imparts to the shaft 46 a precisely predetermined rate of rotation. The brake-clutch assembly 45 is controlled by a common switch 50, the brake 45a disengaging and the clutch 45b engaging in response to closing of the switch and vice versa. As will become apparent more fully below, switch 50 initiates a cycle of operation that is carried out by one revolution of cam 40.

A welding operation, in summary, is carried out in the following manner. While the motor 47 runs continuously, the encapsuled transistor element 10 is placed in the cavity or pocket 21 of the workholder 20 and the wire 11 is placed in the groove 23. The position of capsule 10 is defined by the contour of pocket 21, but wire 11 is variably positionable in groove 23 of holder 22. Subsequently switch 50 is closed so that clutch 45b energized. The energized clutch couples cam 40 to motor 47. The cam 40 then performs one revolution. After a complete revolution either the switch 50 is opened manually or through a conventional control circuit which may include an additional cam, or cam 40 itself may be used to interrupt the clutch circuit. This type of interrupt control is well known and of course, the control may be carried out manually if desired.

During the one revolution the cam 40 controls the entire welding operation. As will be described more fully below, the cam causes the arm 30 first to preposition the two elements 10 and 11 to define the size of the gap across which an arc is to be struck. Thereafter the switches 51 and 52 are closed sequentially to energize the welder control circuit 100 in that a low voltage is applied first to the wires 25 and 26 and to the workpieces and subsequently a high voltage is developed to strike an arc. In precise synchronism with arc ignition the cam 40 moves the two workpieces 10 and 11 again towards each other, brings them into contact, maintains that contact until colled and retracts them together.

Proceeding now to the description of FIG. 3 there is shown the development of the contour of periphery 41 of cam 40. The base line $r_o$ in FIG. 1 corresponds to the smallest radius of the cam 40 with reference to its axis of rotation and it defines, therefore, the lowest portion of the cam (except for a modification to be discussed separately). The cam provides for reciprocating motion of follower 36, for example, in the vertical direction. Hence, cam radius $r_0$ defines the lowest position of follower 36 (and, of course, of workpiece holder 20). The follower is at this lowest position when the system is at rest, i.e., in between welds. The contour of the leftmost side of the diagram shown in FIG. 3 has this radius $r_0$, and defines the position of follower 36 at the beginning of the operating cycle. It is convenient to describe the various portions of the cam contour with reference to the sequential control effects exerted by them upon workholder 20 as these portions progressively control the position of the follower 36 during rotation of the cam 40.

In FIG. 3 the particular cam portion controlling the idle position of follower 36 which actually is an indentation in the cam, is further identified by $t_0$ which means that we assume that at the starting time $t_0$ the switch 50 may be closed to initiate rotation of the cam. The portion 411 of cam 40 that subsequently controls follower 36 is characterized by an increasing radius thus causing the follower 36 along with workholder 20 to move in upward direction. The cam portion 411 terminates in the lobe 412 which actually is a portion of constant radius $r_2$ of the cam disk 40, the radius $r_2$ being larger than the radius $r_0$. Therefore, when the follower 36 reaches the portion 412 it has been moved in upward direction by the difference $r_2 - r_0$.

It was stated above the workpieces 10 and 11 were placed into the respective workholders 20 and 22 prior to the time $t_0$ when the workpiece holder 20 is at its lowermost position. Also, it was stated that wire 11 does not have to be positioned very accurately into groove 23, but the lower tip of wire 11 must be initially spaced from the other workpiece 10 at a distance which is smaller than $r_2 - r_0$. In fact the two workpieces may be initially positioned in contact with each other provided that workpiece 11 is not higher than $r_2 - r_0$ above workpiece 10.

It follows, therefore, that during the time the cam portion 411 of increasing radius advances the position of follower 36, workpiece 10 will meet the wire 11 but thereafter workpiece 10 in workholder 20 continues to move upwards. As was stated above, the clamping force for the wire 11 is slight and as the upward stroke of the workholder 20 continues, the workpiece 10 pushes the wire 11 also in up direction.

At time $t_1$ the upward motion of follower 36 stops because the cam portion 412 succeeding portion 411 is a dwell of the radius $r_2$. Thus, after time $t_1$ workholder 20 and workpieces 10 and 11 are temporarily at rest. It is apparent that it is immaterial which workpiece is shifted relative to its holder and which one stays fixed, or whether both of them shift. The initial position of the two workpieces is completed by time $t_1$. Presently the workholder 20, acting through the workpiece 10, has now actually placed the wire 11 in a particular position relative to its holder 22. If, subsequently, the workholders are moved apart by a particular distance, the workpieces will be automatically spaced apart by that distance.

The dwell or plateau 412 of constant radius $r_2$ does not have to be too long but some length is required to provide for some settling so that the position of the wire 11 is positively defined. It is emphasized that up to that point no current flows through the welding system. At a time $t_2$ a gap between the two workpieces is initiated because a portion 413 of cam 40 reaches the follower 36 which portion 413 is defined by a decreasing cam radius. Therefore, the spring 37 causes retraction of the feeler arm 36, and the workholder 20, retracts accordingly. Thus workpiece 10 separates from the workpiece 11 at the time $t_2$ and continues to retract therefrom. At the time $t_3$ the cam portion 413 levels off to a lower dwell 414 of constant radius $r_4$, and while follower 36 slides over this lower dwell, workholder 20 is maintained at a particular, retracted position. The workholders have thus been retracted over a distance $r_2 - r_4$ as defined by the difference between the cam radii $r_2$, $r_4$. The difference $r_2 - r_4$ defines also the present distance between the two workpieces, this distance being the maximum air gap distance over which an arc may be ignited.

During the period in which the follower 36 maintains workholder 20 in retracted position, switch 51 is closed which may be at any time after $t_2$, for example at time $t_4$. In response thereto the welder control circuit 100 causes a low voltage to be applied to the wires 25, 26. As stated, this voltage is insufficient to strike an arc across the gap between the two workpieces 10 and 11, which gap is of the dimension $r_2 - r_4$. Switch 51 is positioned in advance of follower 36 with reference to the direction of rotation of cam 40, and is operated by the lobe 416 of largest radius. The function of that lobe with reference to follower 36 will be described below.

The switch 52 may be closed to trigger the arc at any selected time $t_5$ after time $t_4$ and before the follower 36 climbs the cam slope 415 at time $t_6$ at the level of the initial upper dwell 412 that is indicated by the broken line 412a and thereby brings the heated workpieces together. The arc is extinguished when the follower 36 brings the two workpieces together, but because the cam slope 415 continues to rise above the level 412a, the two workpieces are forcibly crowded together to fuse their molten end portions together. The second upper dwell 416 of constant cam radius $r_6$ is reached at time $t_7$. The welding arc current flows during the period between the times $t_5$ and $t_6$. The friction with which the wire 11 is held in holder 22 is sufficient to resist the initial crowding force and only after the softened portions of wire 11 and element 10 have been driven into each other does the wire 11 move bodily in response to the crowding force.

In the time interval between $t_7$ and $t_8$ the upper dwell 416 of constant radius $r_6$ keeps the follower 36 stationary.

It will be recalled that switch 51 is angularly displaced from follower 36 so that cam lobe 416 operates the switch earlier in a welding cycle than the arrival of the follower 36 at this cam lobe. The switch 51 may be closed by came lobe 416 at any time between $t_4$ and time $t_5$.

At time $t_8$ a portion 417 of declining radius of the cam reaches the follower 36 and spring 37 causes the workholder 20 to retract according to the slope of cam portion 417. During the downward retraction of workpiece 10, wire 11 is welded thereto and slips out from under the clamp 24.

At about the time $t_9$ the operating cycle is completed and switch 50 opens to stop cam 40. The two pieces which have been welded together may then be removed from the workholder 20 in preparation for a new operating cycle.

It shall now be described how the switches 51 and 52 control the entire welding process, to the extent that they are themselves controlled by cam 40. A representative example of the control circuit 100 is shown in FIG. 4.

Reference numeral 60 generally denotes an electric power supply unit for the welding control circuit in accordance with the present invention. The power supply includes a transformer 61 having a primary 62 which is connected to the same external power supply source, for example, the mains, as are motor 47 and brake-clutch assembly 45. This transformer 61 has a core on which there are two secondary windings which are not shown in detail.

Reference numeral 63 denotes a low voltage d-c power supply for the welder circuit which is also not shown in detail but it includes one of the secondary windings of transformer 61 for voltage step-down. The low voltage d-c source 63 includes further a conventional rectifier to supply a particular d-c voltage potential to an output line 64, the output being variable in a range of 40 to 100 volts. The network 63 may include additionally a voltage regulator such as, for example, a transistor serving also as rectifier and having in its control circuit suitable, adjustable impedance means for adjusting of the d-c voltage for line 64. Alternatively or additionally the secondary winding of transformer 61 feeding the a-c voltage to the rectifier in unit 63 may be adjustable. All of these elements are conventional and do not require elaboration, since they are shown in the above mentioned U.S. Pat. Nos. 3,254,193; 3,254,194; and 3,254,195. A second d-c output line 64b provides d-c voltage at a different level.

Reference numeral 65 denotes a high voltage d-c power supply unit which does not require regulation as the voltage constancy and the level accuracy of the mains suffices here. The unit 65 includes another secondary winding of the transformer 61, preferably having a higher number of turns than the primary 62 to provide for voltage step-up. The output line 66 of unit 65 receives a high d-c voltage, for example, of 800 volts positive relative to ground, whereas a second output line 67 of unit 65 receives a negative d-c voltage potential of 800 volts negative relative to ground, so that the potential difference between the lines 66 and 67 is 1600 volts. These voltages will be used to feed an arc ignition circuit.

The d-c voltage of line 64 is passed to an adjustable capacitor bank 70. The capacitor bank includes a plurality of capacitors individually connectible through resistors between the line 64 and ground so that a particular amount of electric energy can be stored. The total charge depends, of course, on number and size of the capacitors placed into circuit to be charged and on the voltage applied through line 64 for charging. Both total effective capacitance and voltage determine the amount of energy available for discharge. The electrical energy accumulated in capacitor bank 70 can be discharged through the line 71, and the voltage in line 71 will be essentially the same as in line 64.

The lines 64 and 71 are now in addition governed by the contacts 76, 77 of a relay 75. The energizing coil of the relay 75 is under control of the switch 51, mentioned above. Switch 51 when closed connects relay coil 75, between ground and line 64b which is a constant, non-adjustable low voltage d-c output of the unit 63. As long as relay 75 is not energized contact 76 is closed and contact 77 is open. This is the normal state as switch 51 is, in fact, normally open (up to time $t_3$ as was explained above). Therefore, the relay 75 is normally unenergized so as to permit the capacitor bank 70 to be charged through the normally closed contact 76. On the other hand, contact 77 is normally open to prevent any discharge of the capacitor bank 70, accidentally or otherwise, during the charging process. Moreover, contact 77 governs all those circuit portions with which personnel may come into contact prior to the actual welding operation and the open contact 77 permits the prepositioning of workpieces as explained above.

When relay 75 energizes, contact 76 opens and contact 77 closes to thereby provide a connection from the capacitor bank to a series circuit network which includes directly a feed-through capacitor 78, a secondary winding 82 of a saturable core type transformer 81, the line 25 mentioned above and one of the workpieces which, in this case, is the wire 11. As long as no arc exists across the gap between workpieces 10 and 11, or as long as the workpieces 10 and 11 do not contact each other, the high impedance of the unionized gap holds that series circuit open even when contact 77 is closed.

The wire 26 connects the other workpiece 10 to ground as was already mentioned above. Therefore, with a gap between the two workpieces 10 and 11, the capacitor bank 70 can discharge when the contact 77 closes, provided there is an arc between the two workpieces. As mentioned above, the switch 51 closes at time $t_4$. As shown in FIG. 1, the follower arm of the switch 51 is positioned ahead of the follower 36 with respect to the direction of the rotation of cam 40. Therefore, the lobe 416 which is the one with the largest control radius $r_6$, will enter the range of the follower arm of switch 51 ahead of the follower 36. Particularly switch 51 closes when follower 36 has completed the positioning of a workpiece 10 at the desired gap distance from workpiece 11. Contact 77 is closed and the capacitor bank voltage becomes effective across the gap between the workpieces 10 and 11 only after the prepositioning of the workpieces has been completed, and when they are separated from each other by the cam lobe difference $r_4 - r_2$. It is essential that the voltage then applied across the gap between the two workpieces be insufficient to strike an arc. Therefore, for igniting an arc additional provision must be made as will be described next.

The control circuit for arc ignition is divided into an arc igniting circuit, generally designated 80, and a trigger circuit, generally designated 90. The arc igniting circuit 80 includes a multi-turn secondary winding 82 of saturable core type transformer 81 that has a primary winding 83 of but a few turns. For example, the winding 82 may have 29 turns and the winding 83 may have 2 ½ turns so that the voltage step-up ratio is about 1:12 for developing an extremely high voltage across the secondary winding 82.

One end of the primary 83 is connected through a capacitor 84 to an elongated, high refractory type electrode 85a of an electrode system that is generally designated 85. Representatively, electrode 85a may be a cylindrical rod of 1 ½ inches length and ¼ inch diameter. The other side of the winding 83 is connected through a second capacitor 87 to an electrode 85b which is similar to electrode 85a and which is also in the electrode system 85. Capacitor 87 is overbridged by a resistor 89 of, for example, 15 KΩ. Electrodes 85a and 85b are placed in parallel (physically) and at a distance of about ½ inch from each other. They are respectively connected with their other ends to the high voltage d-c power supply lines 66 and 67 using individual high ohmic resistors 88a and 88b, respectively for the connection. Each of the resistors 88a and 88b may have a resistivity of the order of 100 K Ω. A third electrode 85c, in the electrode system 85 is of similar configuration as the other two electrodes and is interposed between them and in parallel spacial relationship thereto.

Electrode 85c does not extend all the way into the gap between electrodes 85a and 85b. Thus, there are now defined three air gaps. The first one, 86a, is between electrodes 85a and 85b beyond electrode 85c. The second gap 86b is between electrodes 85b and 85c, and the third gap 86c is between electrodes 85c and 85a.

The capacitor 84 is connected directly to the high voltage power supply source 65 through resistors 88a, 88b and 89. Thus, capacitor 84 is normally charged to 1600 volts. The charge time is short in relation to sequential welding cycles as defined by revolutions of cam disk 40, so that the capacitor 84 is always charged when needed. The gap 86a is so wide so that the 1600 volts thereacross are not sufficient to strike an arc. The electrode 85c is normally grounded so that across each of the gaps 86b and 86c there are 800 volts and these gaps are likewise too large for ignition of an arc. Thus, normally there is no arc across any of the gaps in the electrode system 85, and there is no voltage across the windings 82 and 83. Also, any charge current for capacitor 84 is quite low and the charge is completed before contact 77 closes within a welding cycle.

The trigger circuit 90 for the arc igniting circuit 80 includes a transformer 91 which is of the flyback type and has a saturable core, a high voltage, secondary winding 92 and a low voltage primary winding 93 of fewer turns than the secondary winding. The secondary winding 92 is connected between electrode 85c and ground, so that electrode 85c is at ground potential as long as no voltage is induced in winding 92. A capacitor 94 is connected to ground and to one of the low d-c voltage supply lines, for example, previously mentioned line 64b and through a high ohmic resistor 96. The capacitor 94 serves as a temporary power supply for the trigger circuit.

One end of the primary winding 93 is connected to the junction between capacitor 94 and resistor 96, the other end of the primary winding 93 is connected to one main electrode (here the cathode) of a silicon controlled rectifier 95 having its anode electrode grounded. The control electrode of rectifier 95 is connected through an RC circuit 99 to one side of the previously mentioned switch 52, which when closed, connects the control electrode of the silicon rectifier 95 to the same source for the anode potential thereof which is ground.

To explain the function of the trigger and arc ignition circuits, reference is made first to FIG. 1 and to the cam configuration shown in FIG. 3. It will be recalled that at the time $t_5$ the switch 52 was caused to close and that thereafter the gap between the two workpieces closes.

Switch 52 closes the control circuit for the silicon controlled rectifier or semiconductor type "thyratron" 95. The contact of switch 52 can be expected to rebound, but the initial closing "fires" the rectifier 95. This requires less than a microsecond, so that any rebounding of contact 52 has no effect on the continued state of conduction of semiconductor device 95.

As silicon controlled rectifier 95 conducts, it connects the charged capacitor 94 across the primary winding 93. The capacitor discharges very rapidly and a high voltage surge is produced across the winding 92. The peak value may be 800 volts or thereabouts. The polarity of the voltage is immaterial but in this instance the voltage across the secondary 92 is positive relative to ground. As stated, the electrode 85c has normally ground potential but its potential is now raised by several hundred volts, for example, up to 800 volts. The gap 86b between the electrodes 85b and 85c is sufficient to prevent an arc at the voltage of 800 volts which prevails across the gap as long as the electrode 85c is at ground potential. With the potential of electrode 85c now raised up to about 800 volts positive, the voltage across the gap 86b increases to about 1600 volts. Actually, before that value is reached the gap breaks down and an arc is developed in between the two electrodes 85b and 85c, immediately lowering the potential of electrode 85c to approximately the −800 volt level of electrode 85b so that the full 1600 volts becomes immediately effective across the gap 86c between the electrodes 85a and 85c which breaks down likewise.

The delay in between the sequential or cascaded firing of the gaps 86b and 86c covers a period which is in the microsecond range and below, so are the delay between "firing" of semi-conductor device 95 and the development of the ignition voltage across secondary 92, so that an electric connection is established between the electrodes 85a and 85b a few microseconds or less after the switch 52 has closed. The arcs in the electrode system are sustained by discharge of capacitor 84. Primary winding 83 and capacitors 84 and 87 form a high Q resonant circuit. The high transformer ratio of transformer 81 causes an oscillatory voltage pulse to develop across the winding 82 with peak values in the neighborhood of 10 to 20 thousand volts, depending on the step-up ratio of transformer 81.

It will be recalled that switch 51 cause, through relay 75, contact 77 to close at time $t_4$, i.e., prior to the time $t_5$ when switch 52 closes. Thus, as the high voltage peak is developed across winding 82, a voltage across the workpieces 10 and 11 has already been established. This voltage is the capacitor bank voltage in line 71, which, by itself, is insufficient to strike an arc across the gap defined between the workpieces, up to time $t_5$.

At the time $t_5$ the voltage developed across the secondary winding 82 raises the potential of the workpiece 11 to such an extent that breakthrough occurs with certainty instantly and only microseconds or less after the initial closing of the switch 52. That delay is a fixed one and does not depend upon any particular conditions such as the shape, size, weight, of the workpieces. As it is a fixed delay time, with variations being of the order of electron statistics, one can regard it as a predetermined system constant. Variations in accordance with electron statistics can be disregarded for the purpose of this device.

As the arc is ignited across workpieces 10 and 11, the gap ionizes. The voltage of capacitor bank 70 suffices to sustain and continue the arc. The voltage level of bank 70 and the total amount of energy stored therein are adjusted that at the time $t_6$ the energy stored has been substantially discharged and thus converted into thermal energy by the arc. The thermal energy has thus heated and softened the workpiece ends for the particular period of time, $t_5 - t_6$. At the time $t_6$ the workpieces 10 and 11 make mutual contact and the upward motion of the workpiece 10 continues to crowd the two workpieces together until the weld is completed.

Referring again to the arc ignition and continuation, the gaps 86b and 86c break down sequentially, thereby effectively interconnecting electrodes 85a and 85b. These two arcs initiate in the left hand portions of either electrodes 85a and 85b, which is somewhat remote from capacitor 84, i.e., from the source which actually feeds the two arcs. These two arcs now migrate to the right to reduce the effective resistance in the discharge circuit for capacitor 84, and soon the arcs merge to cross directly the gap between electrodes 85a and 85b. Electrode 85c becomes effectively disconnected from electrodes 85a and 85b so that the trigger circuit 90 is removed as a load from the discharge circuit of capacitor 84. The removal improves the Q of the tank circuit.

As soon as an arc is ignited across workpieces 10 and 11 the effective impedance across winding 82 drops to a very low value, basically that of the ionized gap between the workpieces, so that capacitor 84 discharges also into the main gap. The effective impedance of this additional discharge circuit is reduced in accordance with the ratio of the primary and secondary windings of transformer 81. The energy stored in capacitor 84 will rather quickly be exhausted and the arc in the electrode system 85 will extinguish. The resulting open circuit state for the tank circuit prevents any of the energy stored in capacitor bank 70 from flowing into a parasitic circuit such as the now active ignition circuit. This, however, is not too important an aspect, as the core of transformer 81 will saturate when the capacitor bank 70 discharges, which effectively discouples the ignition circuit from the main discharge path to the two workpieces.

A complete operating cycle can be briefly described in summary as follows. Normally the cam 40 is at rest and contacts 51 and 52 are open. Thus, relay 75 is deenergized, contact 76 is closed; the capacitor bank 70 is being charged but contact 77 is open so that no potential difference is set up between the two workpieces. The capacitor 84 is charged to 1600 volts, but no arc exists in the electrode system 85. Capacitor 94 is charged to a low voltage. Semiconductor 95 is non-conductive.

After the workpieces 10 and 11 have been positioned properly but not necessarily very accurately, (for example, manually), switch 50 is closed and cam 40 begins to rotate. As the workholder 20 moves upward workpiece 10 contacts workpiece 11 and pushes it in upward direction. As contact 77 is open, no current flows between the two workpieces. The upward motion is stopped at a particular point and subsequently the workholder 20 is retracted, leaving the workpiece 11 in a particular position. The retraction of workpiece 10 on workholder 20 covers a particular distance, which is the gap distance between the workpieces 10 and 11.

After this prepositioning of the workpieces, switch 51 closes to energize relay 75 to disconnect the supply 63 circuit from the capacitor bank 70 and to connect the capacitor bank to the two workpieces.

Switch 51 should close sufficiently ahead of the ignition of an arc to make sure that contact 77 has ceased to rebound by the time switch 52 closes. On the other hand, switch 51 should close as late as possible to keep workpieces 10 and 11 at the same potential as long as possible as a protective measure for personnel.

Switch 52 closes at the time $t_5$ and the first closing impact of the movable contact on the stationary contact of the switch fires the silicon controlled rectifier 95 to produce a high voltage pulse across secondary winding 92 which, in turn, fires in sequence the two gaps 86b and 86c in the electrode system 85 to thereby close the tank circuit which includes the two capacitors 84 and 87 and the winding 83. The resulting oscillatory discharge of capacitor 84 produces an extremely high voltage pulse across the winding 82 and an arc is struck across the gap between workpieces 10 and 11. The impedance of the now ionized air gap is reduced permitting the capacitor bank 70 to discharge into the workpieces.

At time $t_6$ substantially all energy of the capacitor bank 70 has been discharged so that by the time of contact between the workpieces 10 and 11 a particular amount of thermal energy has been developed to melt the metal of the tips of the two workpieces. As the workpiece 10 is crowded upward against the wire 11, fusion occurs and the wire 11 is retracted. The two joined pieces 10 and 11 are left in the highest position. After sufficient cooling, cam 40 and spring 37 cooperate to retract the joined pieces 10 and 11. Subsequently cam 40 reaches its initial position and stops. The welded pieces can now be removed from the workholder 20.

Several outstanding features of this welding apparatus should be mentioned. For example, the gap or the particular location of the gap is not predetermined upon initially placing the workpieces into their respective holders. The workpiece 10, therefore, may have any kind of surface configuration and no accurate positioning tool for placing the workpieces into the respective holders is required, nor does manual placement require any great accuracy. Instead, the particular spot of the workpiece to which subsequently the other workpiece is to be welded is used as a pushing surface to place the workpiece 11 into a particular position. Thus, the entire arrangement automatically accommodates itself to the particular configuration of the workpieces to be welded together. The points or surface areas of the two workpieces which are to be welded together, are precisely the ones which are initially used to position the workpiece 11. Consequently, as the workpiece 10 is retracted from that particular position for a precise distance, the gap is defined therewith. The initial positions of the two workpieces relative to the two workholders are not factors in the determination of the width of the gap.

To provide a desirable range of control over the duration of the arc, a choke coil 97 is placed in parallel with a switch 98 between the secondary winding 82 and the workholder for the workpiece 11. Normally the switch 98 is closed to shunt the choke coil but the switch may be opened when prolongation of the duration of the arc is required. The choke coil 97 has a plurality of taps 97a which may be connected selectively to the winding 82 for selected degrees of extension of the duration of the arc.

Figure 5:
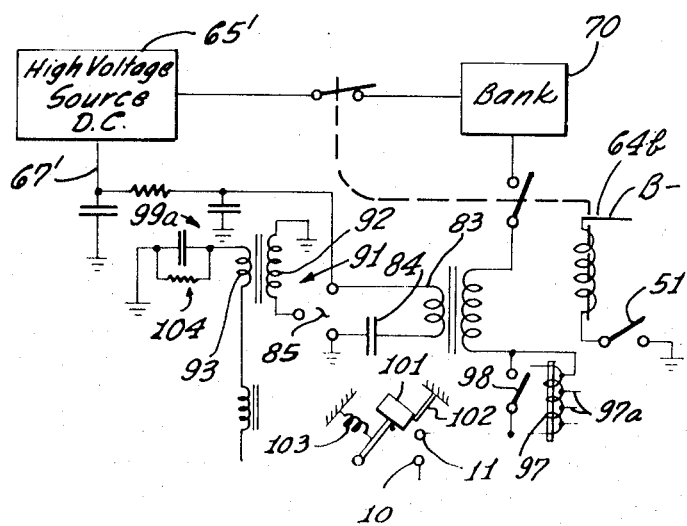
FIG. 5 illustrates an alternative embodiment of this invention partially as block diagram and partially as circuit diagram.

In FIG. 5 there is shown another embodiment of the present invention. The workpiece 10 and 11 are mounted in a hand gun, shown only schematically. One workpiece, here the grounded element 10 is stationary in the gun, while the other element 11 is mounted on a movable holder. A hammer 101 is normally retracted at a position arrested by a releasable stop 102. A spring 103 urges the hammer towards the holder for element 11 but is prevented by the stop 102.

The hammer 101 is electrically connected to one side of the primary winding 93 of transformer 91; the other side of the winding 93 connects to ground through an RC circuit 104. Secondary 92 of transformer 91 is connected between ground and the previously mentioned electrode 85c (not shown) in the electrode system 85 as in FIG. 4. The high voltage source 65' for this embodiment may have only one output line 67'. It should be noted, however, that the arc ignition circuit may be the same as the one shown in FIG. 4, while the one presently described is applicable for the welder described above with reference to FIGS. 1 to 4.

The high voltage of source 65' is applied through a filter 104 and the primary 83 to capacitor 84. The junction between filter 104 and primary 83 leads to electrode 85b, while the other side of capacitor 84 is grounded and also connected to electrode 85a. The remainder of the circuit is as was described with reference to FIG. 4.

For operation switch 51 is closed first so that relay 75 can function as heretofore described and this may be done at any time before the welding gun is triggered. Thus, the potential of the capacitor bank is applied to workpiece 11, but is insufficient to strike an arc. The stop 102 may be released concurrently or later and spring 103 causes the hammer 101 to strike towards the workpiece 11.

The hammer 101 serves as a switch for connecting electrically the workpiece 11 to the primary winding 93 of the trigger circuit transformer 91. A small portion of the charge of capacitor 70 flows into the RC circuit 104 and that current flows through primary 93. Thus, in this case the electrodes 85 are fired in a similar manner except that the voltages are somewhat differently rated. The full 1600 volts are normally across gap 86b and must thus not suffice to create an arc. However, the ignition voltage does not have to be large in this case to break that gap down. On the other hand gap 86c must break down when 1600 volts are applied between the electrodes 85a and 85c. Thus, the electrode 85c must be somewhat closer to electrode 85a than to electrode 85b.

As hammer 101 contacts workpiece 11 the potential of electrode 85c is raised to a level so that gap 86b between electrodes 85c and 85b breaks down thereby causing the voltage of electrode 85c immediately to rise to a level so that gap 86c between the electrodes 85a and 85b breaks down also. The ionized auxiliary discharge device 85 connects the capacitor 84 directly across primary winding 83 and the resulting tank circuit resonates. Thus, the main arc ignites across the gap between workpieces 10 and 11 as aforedescribed. Turning now to a second function of the hammer 101, its motion is predetermined by the characteristics and bias of spring 103. Thus, hammer 101 pushes the workpiece 11 towards the workpiece 10 at a controlled rate to complete the weld. This device works satisfactorily in case the weight and size of the workpieces are rather constant; otherwise, weight variation of the particular workpiece that is being moved may cause variation in the time between the arc ignition and the contact making. No such variation occurs in the device shown and explained with reference to FIGS. 1 through 4.

FIG. 7 is a visual summary of the stages of relative movement between the two workpieces 10 and 11 at the different times $t_o - t_7$. In FIG. 7 it is assumed that $t_5$ occurs on the cam slope 415 just before $t_6$. FIG. 7e shows the relative positions of the two workpieces at $t_5$ and FIG. 7f shows an arc designated 300 that is established at that instant. FIG. 7 further shows how the two workpieces make mutual contact at $t_6$ and are then crowded together to make the finished weld that is accomplished at $t_7$.

FIG. 7 makes clear that with the two workpieces 10 and 11 positioned at random in the corresponding workholders in such manner that the two workpieces abut each other at $t_1$ the starting gap that is provided in preparation for the welding operation is determined solely by the retraction of the movable workholder from the position $t_1$ so that the gap at $t_3$ is an accurately predetermined gap that will be formed automatically on each operating cycle. At $t_4$ the two workpieces are charged with a voltage as indicated and the arc may be established at the gap dimension shown in $t_4$ which is the starting gap because $t_3$ and $t_4$ are spaced apart by a cam dwell of constant radius; or the establishment of the arc may be delayed until the two workpieces are relatively close together as indicated at FIG. 7f.

Referring back to FIG. 3 it may be seen that the dwell 414 is of substantial circumferential extent and the leading slope 415 of the second lobe is of substantial circumferential extent. It is apparent therefore that there is a substantial range for adjustment of the duration of the arc. For example, the range of adjustment may be from 300 microseconds to 3 milliseconds.

FIGS. 8 and 9 show how two workholders 20a and 22a corresponding to the previously mentioned workholders 20 and 22 may be adapted for a fully automatic cycle which includes automatic clamping of the two workpieces 10 and 11. The workholder 20a is in the form of a rod, one end of which constitutes a cam follower 36a that corresponds to the previously described cam follower 36 and cooperates in the same manner with the previously described cam 40.

The workholder 20a has a noncircular shank portion 200 which is slidingly mounted in a pair of spaced guides 202 and 204 with a coil spring 205 under compression between the guide 204 and a collar 206 on the workholder to bias the follower 36a effectively against the cam 40. The workholder 20a has a leading stem portion 208 which forms a seat to receive the workpiece 10, the stem portion being removable to permit the substitution of a different stem portion to accommodate a workpiece of different shape or dimension. A pair of jaws 210 is mounted on pivots 212 to releasably clamp the workpiece 10 and the two jaws have corresponding operating arms which are connected by a pair of toggle links 214 to a pivot 215 on an armature 216 of a clamping solenoid 218. The armature 216 is normally advanced with the two jaws 210 open as shown in FIG. 8 but energization of the solenoid 218 retracts the armature to close the jaws 210 to tightly grip the workpiece.

The stationary workholder 22a is formed with a straight groove 220 to slidingly seat the wire or workpiece 11 and a jaw 222 is provided to clamp the workpiece in the groove. The jaw 222 is mounted on a pivot 224 and has an operating arm 225 that is connected by a coil tension spring 226 to the armature 228 of a clamping solenoid 230. Here again the armature 228 is normally extended with the jaw 222 retracted and energization of the solenoid 230 retracts the armature to close the jaw. The spring 226 has a relatively light spring force which is sufficient to cause the workpiece 11 to be retained in the required slidable manner.

Preferably the workholder 20a is further suitably provided with an ejection solenoid 232 having a normally retracted armature 234. When the solenoid 232 is energized the armature 234 advances with a snap action to eject the finished welded product at the end of the operating cycle.

Figure 6:
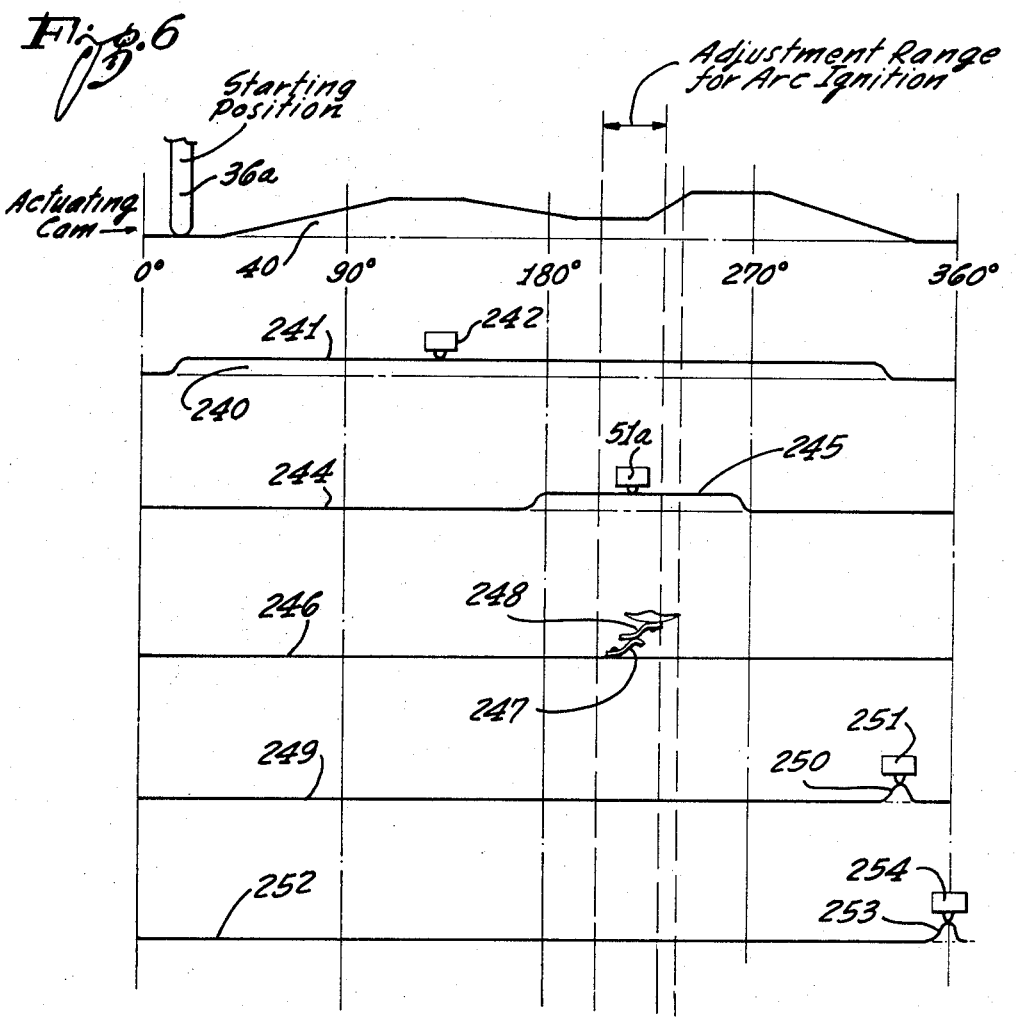
FIG. 6 is a diagram showing developments of five cams on a common cam shaft that may be employed to carry out the operating cycle.

FIG. 6 indicates diagrammatically how a cam assembly of five rotary cams may be mounted on a common cam shaft (not shown) to carry out a fully automatic cycle which includes the steps of temporarily clamping the two workpieces and subsequently ejecting the finished welded product. The five cams comprise: the previously mentioned cam 40 which cooperates with the follower 36a to control the movable workholder 20a in the manner heretofore described; a cam 240 having a circumferentially extensive upper dwell 241 to cooperate with a normally open switch 242 for energizing the two clamping solenoids 218 and 230 throughout the major portion of the operating cycle; a cam 244 having a lobe with an upper dwell 245 to operate an associated switch 51a which corresponds to the previously mentioned switch 51 for placing a voltage across the two workpieces; a cam 246 carrying a contact 247 to cooperate with a contact 248 to serve as an arc-triggering switch in the manner of the previously mentioned switch 52; a cam 249 having a short lobe 250 to operate a cooperative switch 251 for momentarily energizing the ejection solenoid 232; and finally, a cam 252 having a short lobe 253 to open a normally closed switch 254 to terminate the rotation of the cam assembly.

As shown in FIG. 10 the normally stationary contact 248 may be mounted on an arcuate rack 260 that is concentric to the cam shaft and is rotatably supported thereon by a pair of arms 262. Teeth 264 of the arcuate rack mesh with a worm 265 on an adjustment shaft 266 that is manually operable by a knob 268. The knob 268 carries a pointer 270 which, as indicated in FIG. 11, is movable along a graduated scale 272 that is calibrated in terms of microseconds of arc duration. For example, the scale 272 may show a range from ⅛ millisecond to 8 milliseconds.

Figure 12:
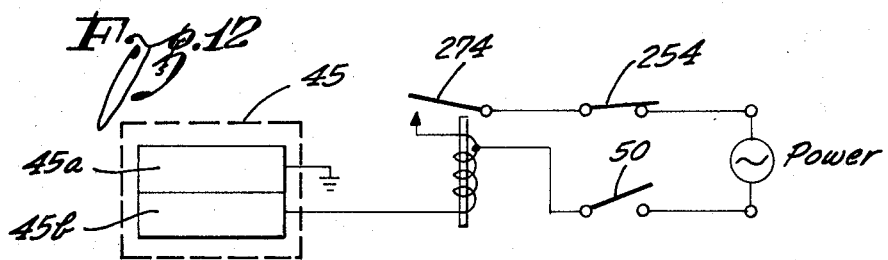
FIG. 12 is a wiring diagram modification.

FIG. 12 indicates how the previously described circuit in FIG. 4 may be modified for cooperation with the cam arrangement shown in FIG. 6. The switch 50 is a push button switch which energizes a relay having a normally open locking contact 274 in a locking circuit that includes the previously mentioned switch 254 that is normally closed and is opened when released by the cam lobe 253. Thus momentarily depressing the starter switch 50 long enough to permit switch 254 to close causes one rotation of the cam shaft to be carried out automatically. First the two clamping solenoids 214 and 230 are energized and subsequently the switch 51a is operated by the cam 245 to set up the required voltage across the two workpieces. Still later the cam contact 247 of FIG. 6 cooperates with contact 248 to initiate the welding arc. After the heated work parts abut with each other the switch 51a is released by the cam lobe 245 for recharging the capacitor bank and subsequently the energization of the two clamping solenoids by the switch 242 is terminated. Then the cam lobe 250 closes the switch 251 momentarily to operate the ejection solenoid 232 to eject the welded product. Finally, cam lobe 253 opens the switch 254 to break the relay locking circuit to operate the clutch 45b and the brake 45a to stop the cam assembly.

In a typical embodiment of the invention, the motor 47 operates at 1800 rpm and incorporates reduction gearing which steps down the velocity by one sixth to rotate the shaft 46 at approximately 300 rpm. When the clutch 45b is closed an auxiliary mass is added to the constantly rotating structure, which auxiliary mass includes parts of the clutch 45b, parts of the brake 45a, the shaft 44, the gears 42 and 43 and the rotary cam means along with the shaft on which the rotary cam means is mounted. With the major portion of the driving mass constantly rotating at 1800 rpm and a minor portion thereof constantly operating at 300 rpm and with the auxiliary mass that is added by the clutch 45b and associated parts quickly accelerated to 300 rpm to start an operating cycle and with all of these rotating parts having a combined weight of approximately 2¼ pounds the momentum available for actuating the movable workholder 20a is exceedingly high relative to the inertia of the six ounce workholder 20a. It may be readily appreciated that the driving momentum is so overpowering that the effect of picking up the auxiliary weight including the cam means is insignificant and full acceleration of the cam means is accomplished in advance of the operating cycle, i.e. before the cam 40 starts to actuate the workholder 20a.

Whenever a change over to the welding of different workpieces requires a change in the rate at which the gap between the two workpieces is closed, it is a simple matter to substitute a new cam 40 having lobes with slopes of different inclination.

The invention is not limited to the embodiments described above but all changes and modifications thereof not constituting departures from the spirit and scope of the invention are intended to be covered by the following claims.

We claim:

1. In an apparatus for joining two workpieces by arc welding, the combination of:
    two workholders for the two workpieces, respectively, normally spaced apart to provide a gap between the two workpieces;
    cam means;
    follower means cooperative with the cam means and operatively connected with at least one of the two workholders to cause relative movement between the two workholders to close the gap between the two workpieces;

a power actuated structure normally rotating in a steady state condition with relatively high momentum;

means to operatively connect the rotating structure with the cam means for actuation thereof through one operating cycle which includes closing the gap between the two workpieces;

means responsive to the cam means to place a voltage across the two workpieces during the operating cycle before the gap closes; and means responsive to the cam means to strike an arc between the two workpieces while said voltage exists and before the gap closes.

2. A combination as set forth in claim 1 which includes means on the two workholders respectively responsive to the cam means to releasably grip the two workpieces early in the operating cycle and subsequently to release the two workpieces.

3. A combination as set forth in claim 1 which includes means responsive to the cam means to eject the welded product at the end of the operating cycle.

4. A combination as set forth in claim 1 which includes:

capacitor means;

means responsive to the cam means to place a charge on the capacitor means; and means responsive to the cam means to connect the two workpieces to the capacitor means thereby to place said voltage across the two workpieces.

5. A combination as set forth in claim 1 in which said means to strike an arc is manually adjustable relative to the cam means to vary the point in the operating cycle at which the arc is created.

6. A combination as set forth in claim 5 which includes indicator means responsive to adjustment of the means to strike the arc.

7. A combination as set forth in claim 6 in which said indicator means is calibrated in terms of units of time measuring the interval between the striking of the arc and the closing of the gap between the two workpieces.

8. A combination as set forth in claim 1 which includes means on one of said workpieces to yieldingly retain the corresponding workpiece in a manner to permit forcible sliding retraction of the corresponding workpiece by the other of the two workpieces.

9. A combination as set forth in claim 8 in which said cam means is of a contour to cooperate with said follower means to close the gap between the two workpieces two times in succession in the working cycle to permit said one workpiece to be retracted the first time for the purpose of establishing a predetermined gap between the two workpieces before the arc is created.

10. A combination as set forth in claim 8 in which said cam means is of a contour to continue to urge the two workpieces together after the gap is closed and while the two workpieces are heated by the arc, thereby to crowd the two workpieces together for mutual fusion, whereby the force with which the two workpieces are crowded together is limited by the degree of resistance to retraction of the yieldingly retained workpiece.

11. A combination as set forth in claim 1 in which the means to operatively connect the power actuated structure to the cam means includes speed reducing means.

12. In an apparatus for joining together pairs of workpieces by arc welding in repeated operating cycles, the combination of:

rotary cam means;

two workholders to hold the two workpieces in positions with a predetermined starting gap between the two workpieces;

follower means cooperative with the cam means to cause relative movement between the two workpieces to close the gap between the two workpieces;

means controlled by said cam means to replace a voltage across the two workpieces prior to the closing of the gap;

means controlled by the cam means to apply a high frequency pulse across the two workpieces thereby to trigger an arc prior to the closing of the gap;

a driving mass;

means to rotate the driving mass at a substantially constant velocity; and means to operatively connect the cam means to the driving mass for one cycle of operation of the cam means, whereby the flywheel effect of the rotating driving mass causes the successive cycles to be precisely identical with respect to their patterns of movement of the timing relationships involved.

13. A pulse arc welder comprising:

workpiece holding means constructed for providing reciprocating motion to move a pair of workpieces towards each other and away from each other, the pair of workpieces moving in unison relative to the holding means when the work pieces contact each other during a continued motion of the holding means for moving the workpieces towards each other, the position of either of the pair of workpieces relative to the holding means being maintained when the work pieces are moved subsequently away from each other by the holding means;

motion control means for the holding means for controlling the moving of the workpieces into contact for positioning the workpieces relative to the holding means, for moving the workpieces away from each other and for subsequently moving the workpieces towards each other again at a controlled rate from a predetermined distance into contacting position;

first control means for applying to the workpieces a voltage when the distance of the workpieces from each other is insufficient to cause striking of an arc, but sufficient to sustain an existing arc; and second control means operatively coupled to the motion control means for applying a high voltage across the workpieces at the instant when the workpieces move from a particular distance towards each other at the controlled rate.

14. A pulse arc welder as set forth in claim 13 in which the second control means includes a high frequency tank circuit and an auxiliary discharge gap in the tank circuit further including a control circuit for controlling the ionization of the auxiliary discharge gap, the control circuit being under control of the motion control means for ionizing the discharge gap causing the tank circuit to resonate, and circuit means for connecting the tank circuit to the workpieces to ignite an arc across the workpieces upon the resonance of the tank circuit.

15. A pulse arc welder as set forth in claim 13 wherein the circuit means include variable impedance means through which the high voltage pulse is applied to the gap.

* * * * *